United States Patent [19]
Keida et al.

[11] Patent Number: 5,493,686
[45] Date of Patent: Feb. 20, 1996

[54] DATA PROCESSOR IN WHICH EXTERNAL SYNC SIGNAL MAY BE SELECTIVELY INHIBITED

[75] Inventors: Haruo Keida, Tokorozawa; Takashi Tsukamoto; Nobutaka Nagasaki, both of Kodaira, all of Japan

[73] Assignees: Hitachi, Ltd.; Hitachi Microcomputer Engineering Ltd., both of Tokyo, Japan

[21] Appl. No.: 434,292

[22] Filed: May 3, 1995

Related U.S. Application Data

[62] Division of Ser. No. 301,740, Sep. 7, 1994, which is a continuation of Ser. No. 955,447, Oct. 2, 1992, abandoned, which is a continuation of Ser. No. 577,123, Sep. 4, 1990, Pat. No. 5,179,694, which is a continuation of Ser. No. 230,047, Aug. 9, 1988, Pat. No. 4,967,352, which is a continuation of Ser. No. 894,841, Aug. 8, 1986, abandoned.

[30] Foreign Application Priority Data

Aug. 23, 1985 [JP] Japan ................... 60-184207

[51] Int. Cl.⁶ .................. G06F 1/04; G06F 15/78
[52] U.S. Cl. ............. 395/800; 395/550; 364/232.8; 364/232.9; 364/271.1; 364/DIG. 1
[58] Field of Search .................. 395/800, 775, 395/575, 550, 425, 275

[56] References Cited

U.S. PATENT DOCUMENTS

| | | | |
|---|---|---|---|
| 4,112,490 | 9/1978 | Pohlman et al. | 395/325 |
| 4,153,933 | 5/1979 | Blume, Jr. et al. | 395/325 |
| 4,349,870 | 9/1982 | Shaw et al. | 395/800 |
| 4,462,072 | 7/1984 | Tague et al. | 395/550 |
| 4,467,420 | 8/1984 | Murakami et al. | 395/425 |
| 4,503,490 | 3/1985 | Thompson | 395/550 |
| 4,694,393 | 9/1987 | Hirano et al. | 395/750 |
| 4,769,767 | 9/1988 | Hilbrink | 395/375 |
| 4,825,407 | 4/1989 | Loessel et al. | 395/550 |
| 5,067,077 | 11/1991 | Wakimoto et al. | 395/400 |

*Primary Examiner*—Alyssa H. Bowler
*Assistant Examiner*—Alpesh M. Shah
*Attorney, Agent, or Firm*—Antonelli, Terry, Stout & Kraus

[57] ABSTRACT

An external sync signal generated by a clock generation circuit inside a single-chip microcomputer is supplied to an external terminal of this chip. The external sync signal is necessary in an external expansion mode but not in a single-chip mode. Therefore, the external sync signal is supplied to the external terminal through a control gate while a suitable control signal is inputted to a control terminal of the control gate. According to this circuit construction, control can be made in such a manner that the external sync signal is not supplied to the output terminal in the single-chip mode. As a result, it becomes possible to prevent noise from entering a signal supplied to an adjacent pin through a coupling capacity between the external terminals in the single-chip mode, and to reduce consumed power of an output buffer circuit which is disposed between the control gate and the external terminals.

10 Claims, 2 Drawing Sheets

DATA PROCESSOR IN WHICH EXTERNAL SYNC SIGNAL MAY BE SELECTIVELY INHIBITED

This is a divisional of application Ser. No. 08/301,740, filed Sep. 7, 1994; which is a continuation of application Ser. No. 07/955,447, filed Oct. 2, 1992, now abandoned; which is a continuation of application Ser. No. 07/577,123, filed Sep. 4, 1990, now U.S. Pat. No. 5,179,694, issued Jan. 12, 1993; which is a continuation of application Ser. No. 07/230,047, filed Aug. 9, 1988, now U.S. Pat. No. 4,967,352, issued Oct. 30, 1990; which is a continuation of application Ser. No. 06/894,841, filed Aug. 8, 1986, now abandoned.

BACKGROUND OF THE INVENTION

This invention relates to data processing technique and more particularly to technique which is effective when applied to microcomputers. The present invention relates to technique which can be utilized effectively, for example, for an output system of an external sync signal in a single-chip microcomputer having a sync signal.

In conventional single-chip microcomputers such as Model "HD6301V", a product of Hitachi, Ltd., a pin is provided for exclusively outputting an external sync signal called an "E clock" to peripheral devices. This single-chip microcomputer HD6301V includes therein a program storage ROM (read-only memory) and a working RAM (random access memory) and operates by itself, or in other words, a microcomputer system is constituted and operates inside the chip. Besides such a single-chip mode, the microcomputer has an external expansion mode in which the chip constitutes integrally a microcomputer system in cooperation with peripheral devices such as ROMs and RAMs that are connected thereto in order to expand the address space.

In this external expansion mode, the E clock described above is outputted from the single-chip microcomputer to the outside as a sync signal for the exchange of signals between the single-chip microcomputer and the peripheral devices. In the single-chip mode where the peripheral devices are not connected, therefore, the external sync signal (E clock) is not necessary.

However, in the conventional single-chip microcomputers of the type in which the external sync signal is generated inside them, the external sync signal is outputted to the output pin not only in the external expansion mode but also in the single-chip mode.

In this case, there occurs the problem that noise develops in the signal supplied to a pin, which is disposed next to the E clock output pin, because adjacent external terminals (pins) have an undesirable coupling capacity. In the single-chip microcomputers such as HD6301V in particular, the pin adjacent to the E clock output pin receives an input strobe signal SC as an input signal in the single-chip mode. Therefore, noise develops in this input strobe signal SC through the coupling capacity, so that erroneous data are likely to be latched.

Furthermore, an output buffer circuit which outputs the E clock as the external sync signal is constituted by circuit elements having greater sizes than other circuit elements because it must provide a great driving force, and a consumed current becomes great.

The single-chip microcomputer HD6301V having the E clock as the external sync signal is described on pages 279 to 31855 of "HITACHI MICROCOMPUTER DATA BOOK, 8-BIT SINGLE-CHIP" published by Hitachi, Ltd., February, 1985.

SUMMARY OF THE INVENTION

It is a primary object of the present invention to prevent an erroneous operation in a single-chip microcomputer having an external sync signal.

It is another object of the present invention to reduce a consumed current in a single-chip micro-computer having an external sync signal.

It is still another object of the present invention to prevent radio wave interference by eliminating current leakage from an output pin in a single-chip microcomputer having an external sync signal.

In accordance with the present invention, an external sync signal is supplied to an external terminal through a control gate and a suitable control signal is applied to a control terminal of the control gate. According to this circuit arrangement, it becomes possible to inhibit the supply of the external sync signal to the output terminal when the microcomputer is in the single-chip mode. As a result, it becomes possible to prevent noise from occurring in a signal supplied to an adjacent pin through a coupling capacitance between external terminals. It is further possible to reduce the consumed power of an output buffer that is disposed between the control gate and the output terminals.

DESCRIPTION OF THE PREFERRED EMBODIMENTS

Figure 1:
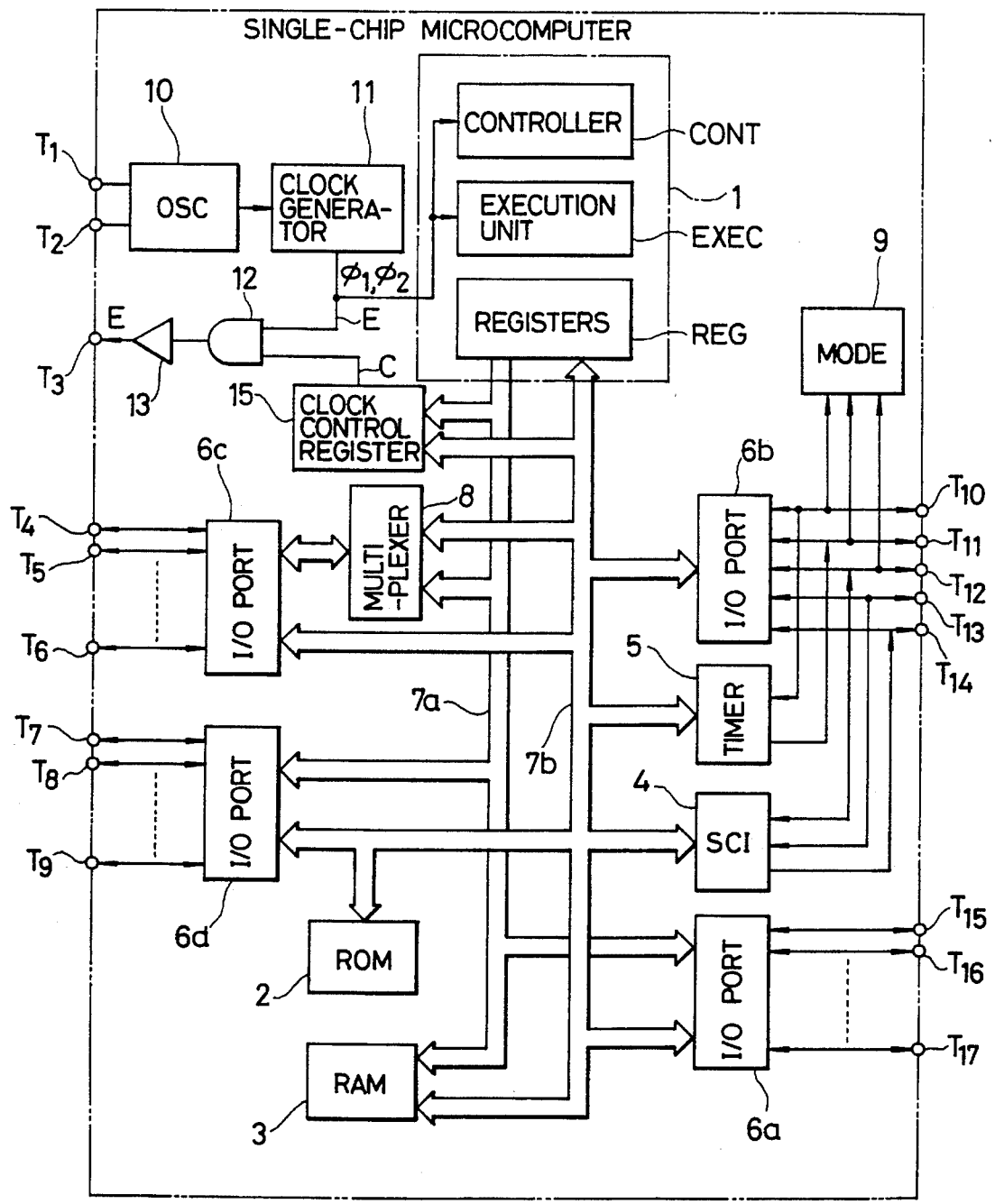
FIG. 1 is a block circuit diagram of a single-chip microcomputer in accordance with one embodiment of the present invention.
Figure 2:
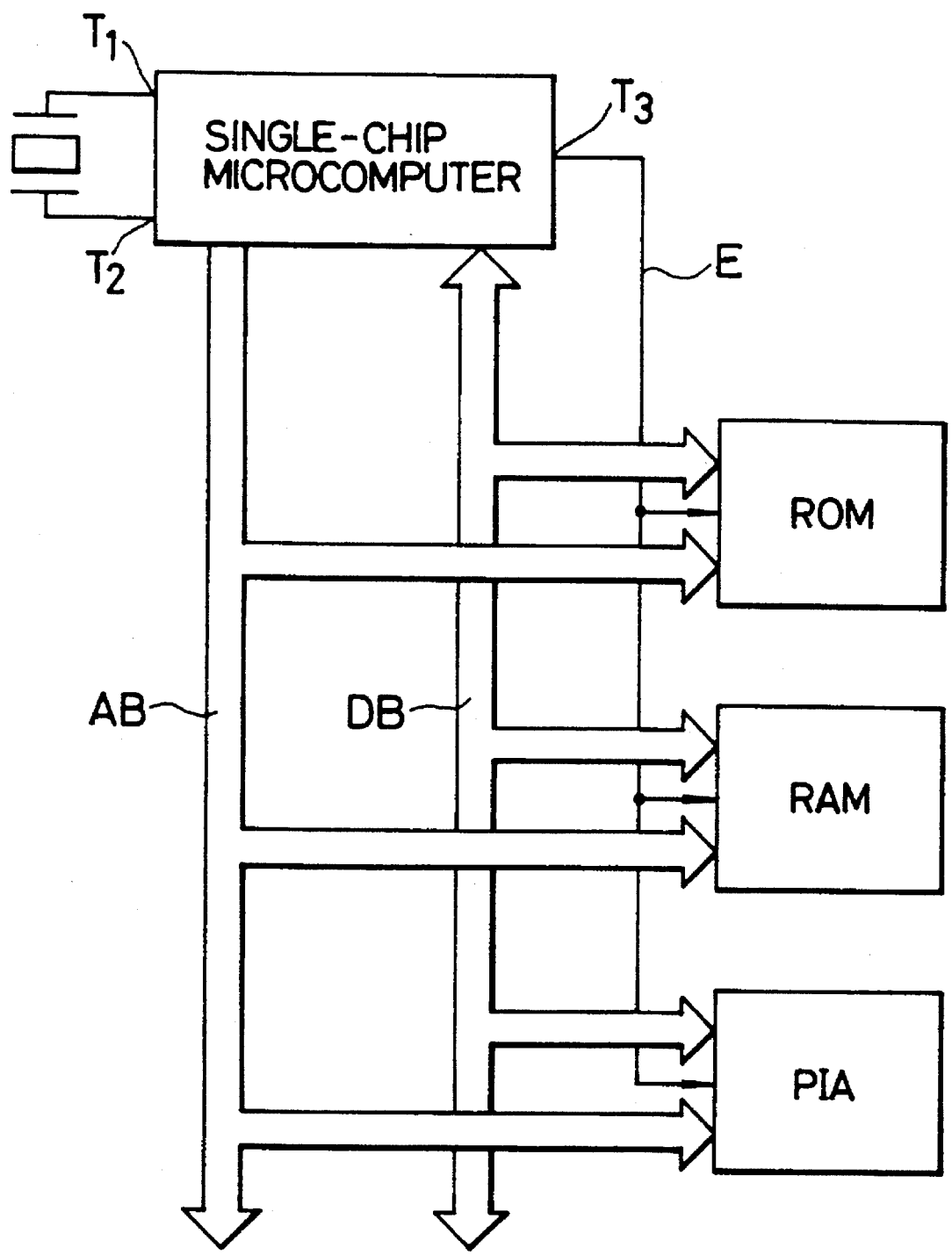
FIG. 2 is a block diagram of a system using the single-chip microcomputer shown in FIG. 1.

FIG. 1 shows an embodiment of the present invention applied to a single-chip microcomputer. Each circuit portion shown in the drawing is formed on one semiconductor substrate such as a single crystal silicon substrate.

The single-chip microcomputer shown in the drawing has substantially the same package structure and terminal arrangement as Hitachi Microcomputer HD6301VCG described in the aforementioned literature, though it is not particularly limitative.

Though not particularly limitative, either, the single-chip microcomputer of this embodiment consists of a central processor unit (CPU) 1 for controlling its internal execution units in accordance with a program, a program ROM 2 storing therein the operation program of CPU1, RAM (random access memory) 3 providing primarily a work area of CPU1, a serial communication interface circuit 4, a timer circuit 5 and four input/output ports 6a to 6d. These circuits are connected to one another by an internal address bus 7a and an internal data bus 7b. Terminals $T_1$ to $T_{17}$ are external terminals connected to pins that are extended outside the package.

The address bus 7a and the data bus 7b are connected to the ports 6a and 6d among the input/output ports 6a to 6d, and they can be connected also to the port 6c through a multiplexor 8. There is further disposed a mode selector circuit 9 which determines the operation mode after resetting of the microcomputer by setting suitable external terminals $T_{10}$ to $T_{12}$ to a predetermined state. The control signal from this mode selector circuit 9 provides the input/output ports 6a and 6d with the data input/output function or the address output function. Similarly, the port 6c is provided with the data input/output function or the function of multiplexing the data bus and the address bus under the control of the mode selector circuit 9.

According to the circuit construction described above, the address space of the single-chip microcomputer of this embodiment can be expanded.

The mode selector circuit 9 takes in the state of the external terminals $T_{10}$–$T_{12}$ at the time of resetting and holds the state, and the mode that is determined once cannot be changed even if the state of the external terminals $T_{10}$ to $T_{12}$ thereafter changes.

Though the detail off CPU 1 is not shown in the drawing, CPU 1 consists, for example, of an arithmetic and logic unit, an execution unit EXEC consisting of exclusive registers such as program counters, stack pointers, status registers and the like, a general-purpose register group REG used as a work area, instruction registers to which the instructions of macroprograms read out from an external memory are sequentially inputted, and a control unit CONT consisting of ROMs (microprogram ROMs) storing the microinstructions corresponding to the macroinstructions, respectively.

The execution unit EXEC is operated in a suitable sequence by a control signal outputted from the control unit CONT, thereby executing desired data processing.

An oscillation circuit 10 and a clock generation circuit 11 are disposed in order to control the operation timing of CPU 1. The oscillation frequency of the oscillation circuit 10 is determined by a circuit element such as a quartz oscillator or a ceramic oscillator that is coupled between the external terminals $T_1$ and $T_2$. The clock generation circuit 11 receives the oscillation output of the oscillation circuit 10, divides suitably the frequency and generates system clocks $ø_1$, $ø_2$ and E.

Among them, the clock E is supplied as the external sync signal to an output buffer 13, too, through a control gate 12 consisting, for example, of an AND gate, and can be outputted outside the chip from the external terminal $T_3$ by this output buffer 13.

In this embodiment, a register 15 is disposed for clock control, and one of the bits of this register 15 is used as an output designation flag of the clock E. The content of the output designation flag is supplied to the other of the input terminals of the control gate 12 to which the clock E is supplied.

The clock controlling register 15 is disposed as one of the internal registers and is connected to CPU 1 through the internal address bus 7a and the internal data bus 7b. When write is made to the register 15 by the program, logic "1" is set to the output designation flag or is cleared to "0".

In this embodiment, when the output designation flag is set to "1", the control signal C supplied to the control gate 12 rises to the high level, though this is not particularly limitative. Therefore, the control gate 12 supplies the clock E outputted from the clock generation circuit 11 to the output buffer 13. Upon receiving this E clock, the output buffer 13 is driven and the clock E is outputted as the external sync signal from the external terminal $T_3$.

On the other hand, when the output designation flag inside the clock controlling register 15 is cleared to the logic "0", the control signal C falls to the low level, so that the control gate 12 is closed and the clock E generated by the clock generation circuit 11 is not supplied to the output buffer 13.

As a result, the leakage of harmonic waves at the rise of output, that results from driving of the output buffer 13 under a non-load state, can be eliminated and the consumed current in the output buffer 13 can be reduced. Since the clock E is not outputted to the external terminal $T_3$, the noise does not enter the input signal of the adjacent terminal, which is adjacent to the external terminal $T_3$, through the coupling capacity between the external terminal $T_3$ and the adjacent terminal.

The single-chip microcomputer having the construction described above has two kinds of operation modes, that is, the single-chip mode and the external expansion mode. In this embodiment, however, the external expansion mode further includes two modes, that is, a multiplex mode of the address and data and their non-multiplex mode.

When the mode selector circuit 9 judges that the operation mode is set to the single-chip mode in accordance with the state of the external terminals $T_{10}$–$T_{12}$, the function of each input/output port 6a–6d is determined by the control signal from the mode selector circuit 9, and the signals on the internal address bus 7a and the internal data bus 7b are not outputted outside the microcomputer. Therefore, the single-chip microcomputer constitutes a microcomputer system by its internal circuit alone. At this time, LED, a motor driver, various sensors, a keyboard scanner and other devices are connected to the external terminals of the chip. The microprocessor unit 1 inside the single-chip microcomputer executes predetermined data processing in accordance with the program inside ROM 2 on the basis of the signals inputted thereto from the keyboard, the sensors or the like, and generates and outputs the control signals for the various devices such as LED, the motor, and the like, that are connected thereto.

In contrast, when the mode selector circuit 9 judges that the operation mode is set to the external expansion mode in accordance with the state of the external terminals $T_{10}$–$T_{12}$. The function of each input/output port 6a–6d is changed by the control signal from the mode selector circuit 9, and the address signals and data signals on the address and data buses 7a and 7b can now be outputted to the external bus, and the signals on the external bus can be taken into the internal data bus 7b. In the external expansion mode, peripheral devices such as ROMs, RAMs or PIAs (peripheral interface adaptors) are connected to the address bus AB and the external data bus DB, and these peripheral devices and the single-chip microcomputer together constitute a microcomputer system.

In the embodiment described above, the clock E is supplied to, or cut off from, the output buffer 13 through the control gate 12 in accordance with the operation mode depending upon whether the output designation flag in the clock controlling register 15, which is disposed inside the single-chip microcomputer as shown in FIG. 1, is "1" or "0". However, in the single-chip microcomputer having the mode selector circuit 9 such as shown in FIG. 1, the signal representing whether the present state is the single-chip mode or the external expansion mode exists inside the mode selector circuit 9. Therefore, it is possible not to supply the clock E, which is generated from the clock generation circuit 11, to the output buffer 13 when the microcomputer is in the single-chip mode by extending a signal representing whether or not the operation mode is the single-chip mode from inside the mode selector circuit 9 and applying this signal to one of the input terminal of the control gate 12, instead of disposing the clock control register 15. According to this arrangement, the output buffer 13 is not driven in the single-chip mode, and the external sync signal is not outputted to the external terminal T₃ so that the same effect as described above can be obtained.

The embodiment shown in FIG. 1 uses the AND gate as the control gate 12 and closes this control gate 12 in the single-chip mode in order not to supply the clock E from the clock generation circuit 11 to the output buffer 13. However, it is also possible to employ a circuit construction wherein the output buffer 13 is of a push-pull type and the control gate 12 is a logic circuit which forms a control signal that brings the output buffer 13 into tristate on the basis of the signal from the output designation flag.

Though the embodiment described above represents the application of the present invention to a single-chip microcomputer having both the single-chip mode and the external expansion mode, the present invention is not particularly limited to such a single-chip microcomputer. For instance, single-chip microcomputers not having the external expansion mode such as Hitach Model HD6805 have an external terminal called an "NUM pin" which is not used for external connection but is used while being kept fixed to the ground potential. This NUM pin outputs to the outside a sync signal necessary For testing when connected to a $V_{cc}$ level at the time of testing. In this case, too, the sync signal is applied up to the final output stage which is connected to the NUM pin in the prior art single-chip microcomputers. Accordingly, the present invention can provide the same effect as described above when applied to the output circuit corresponding to such an NUM pin.

As described above, the present invention provides the following effects.

(1) In single-chip microcomputers having an external sync signal, the present invention supplies the external sync signal generated by the internal clock generation circuit to the microcomputer to the output buffer through the control gate, and inputs a suitable control signal to the control terminal of the control gate in order to inhibit the supply to the external sync signal to the output buffer in the single-chip mode. Since the output to the external sync signal to the output pin is inhibited in the single-chip mode, noise does not enter the signal of the adjacent pin due to the coupling capacity between the external terminals (pins) and hence, the erroneous operation of the circuit can be prevented.

(2) In single-chip microcomputers having an external sync signal, the present invention supplies the external sync signal generated by the internal clock generation circuit of the microcomputer to the output buffer through the control gate, and inputs a suitable control signal to the control terminal of the control gate in order to inhibit the supply of the external sync signal to the output buffer in the single-chip mode. Since the output buffer itself does not operate in the single-chip mode, the leakage of the radio wave from the output pin resulting from the harmonic waves at the time of rise of the sync signal can be eliminated, radio wave interference can be therefore removed and a consumed current in the buffer for clock output that has been extremely great in the prior art microcomputers can be eliminated with the result being in the drastic reduction of the consumed current of the chip as a whole.

Although the present invention has thus been described definitely with reference to its preferred embodiment, the invention is not particularly limited thereto but can of course be changed or modified in various manners without departing from the scope and spirit thereof. For example, in accordance with the embodiment described above, the external terminal T₃ becomes an empty pin which is not at all used in the single-chip mode, and input and output of other signals can be made by use of this pin.

Although the description given above deals primarily with the application of the invention to the single-chip microcomputer as the background and field of utilization of the invention, the present invention is not particularly limited thereto but can be used for logic LSIs with a built-in clock generation circuit because such logic LSIs output a clock signal to the outside at the time of testing.

What is claimed is:

1. A system comprising:

an address bus;

a data bus;

a memory coupled to the address bus and to the data bus; and a single-chip microcomputer coupled to the address bus and to the data bus, wherein said single-chip microcomputer comprises:

a central processing unit, a plurality of external terminals for input and output of signals, a clock signal generation circuit which generates a clock signal, a control circuit which is coupled to the central processing unit and which produces a control signal having one state of a first state when the central processing unit sets to the control circuit first data and a second state when the central processing unit sets to the control circuit second data, wherein the first data indicates supply of the generated clock signal as a sync signal at one of the plurality of external terminals and the second data indicates inhibition of the supply of the generated clock signal at the one of the plurality of external terminals, and a gate circuit which is coupled between the clock signal generation circuit and the one of the plurality of external terminals, which couples the clock signal generation circuit to the one of the plurality of external terminals when the control signal is in the first state, and which uncouples the clock signal generation circuit from the one of the plurality of external terminals when the control signal is in the second state, wherein, if a peripheral device is coupled to the data bus, the first data is set to the control circuit so that the peripheral device operates in sync with the generated clock signal which is supplied to the peripheral device via the one of the plurality of external terminals.

2. A system according to claim 1, wherein said control circuit includes a register to which one of the first data and the second data is set by said central processing unit.

3. A system according to claim 2, wherein said single-chip microcomputer further comprises:

an internal bus coupled to the central processing unit and to ones of the plurality of external terminals; and a mode circuit which designates whether the single-chip microcomputer is to operate in a single-chip mode as a system by itself or in an expansion mode as the system in cooperation with the memory and the peripheral device which are coupled to the central processing unit via the internal bus and the data bus, wherein, in the expansion mode, the peripheral device operates in sync with the generated clock signal from the one of the plurality of external terminals.

4. A system according to claim 1, wherein said single-chip microcomputer further comprises:

an internal bus coupled to the central processing unit and to ones of the plurality of external terminals, wherein the control circuit includes a mode circuit which designates whether the single-chip microcomputer is to operate in a single-chip mode as a system by itself or in an expansion mode as the system in cooperation with the memory and the peripheral device which are coupled to the central processing unit via the internal bus and the data bus, and means for producing the control signal having the first state in response to the expansion mode and for producing the control signal having the second state in response to the single-chip mode, and wherein, in the expansion mode, the peripheral device operates in sync with the generated clock signal from the one of the plurality of external terminals.

5. A system according to claim 1, wherein said single-chip microcomputer further comprises:

an internal bus coupled to the central processing unit and to ones of the plurality of external terminals; and a mode circuit which designates whether said single-chip microcomputer is to operate in a single-chip mode as a system by itself or in an expansion mode as said system in cooperation with the memory and the peripheral device which are coupled to the central processing unit via the internal bus and the data bus, wherein, in the expansion mode, the peripheral device operates in sync with the generated clock signal from the one of the plurality of external terminals.

6. A system according to claim 1, wherein the peripheral device is different from the memory.

7. A system according to claim 1, wherein the memory includes a first memory which receives the generated clock signal from one of the plurality of external terminals so that the first memory operates in sync with the generated clock signal.

8. A system according to claim 7, wherein the first memory is a RAM.

9. A system according to claim 1, wherein the memory includes a ROM and a RAM.

10. A system according to claim 1, wherein the peripheral device is a device which is different from a RAM and a ROM.

* * * * *